UNITED STATES PATENT OFFICE.

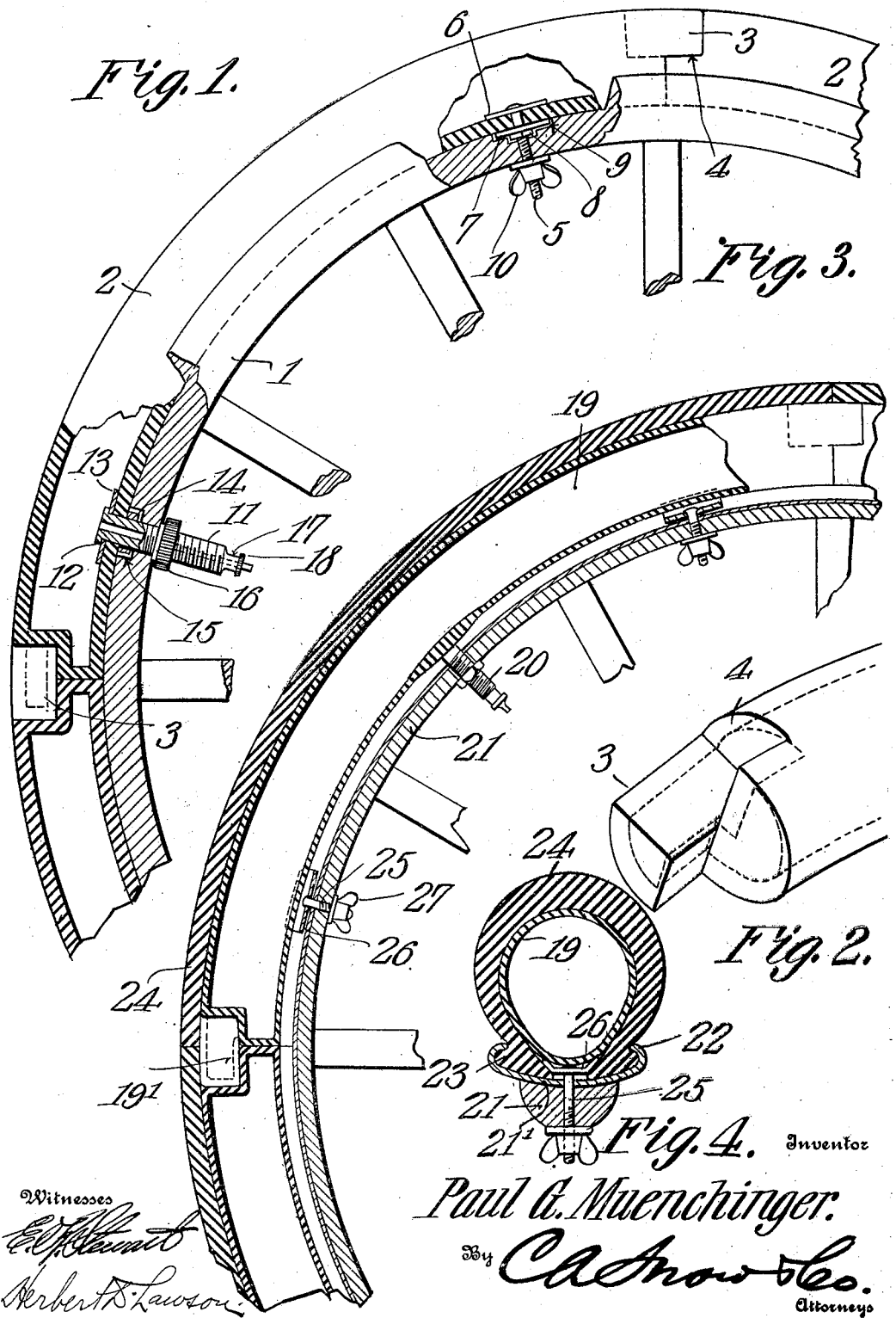

PAUL G. MUENCHINGER, OF NEWPORT, RHODE ISLAND, ASSIGNOR OF ONE-HALF TO EDWARD F. SHIEK, OF BROOKLINE, MASSACHUSETTS.

PNEUMATIC TIRE.

942,734.  Specification of Letters Patent.  Patented Dec. 7, 1909.

Application filed July 27, 1908. Serial No. 445,517.

*To all whom it may concern:*

Be it known that I, PAUL G. MUENCHINGER, a citizen of the United States, residing at Newport, in the county of Newport and State of Rhode Island, have invented a new and useful Pneumatic Tire, of which the following is a specification.

This invention relates to pneumatic tires for use upon automobiles, motor cycles and other vehicles and its object is to provide an inflatable tire made up of separate sections independently inflatable and which can be independently removed and replaced in the event of puncture or other injury thereto.
A further object is to provide tire sections so shaped that when they are assembled they will form a smooth continuous tread which will not produce any undesirable jolting or vibration while the wheel is rotating.
With these and other objects in view the invention consists of certain novel features of construction and combinations of parts which will be hereinafter more fully described and pointed out in the claims.
In the accompanying drawings is shown the preferred form of the invention.

In said drawings: Figure 1 is a view partly in elevation and partly in section of a portion of a wheel having a single tube tire thereon embodying the present improvements. Fig. 2 is a perspective view of one end portion of one of the sections. Fig. 3 is a longitudinal section through a portion of a clencher tire constructed in accordance with the present invention. Fig. 4 is a transverse section through the tire shown in Fig. 3.

Referring to the figures by characters of reference, 1 designates the felly of a wheel the same having its outer face concaved transversely so as to form an efficient seat for the tire. In Fig. 1 a single tube tire has been shown, said tire consisting of a number of similar tubular sections 2 each having its ends closed and provided at each end with a tongue 3 segmental in cross section, there being a segmental recess 4 within each end and at one side of the tongue, the area of said recess being equal to the area of the projecting portion of the tongue. As shown in the drawings this tongue is hollow so that the tire sections are resilient throughout their lengths. When the sections are assembled the tongues 3 of each section rest within the recesses 4 of the adjoining sections so that a continuous tread is produced and inasmuch as the tongues lap it will be obvious that the resiliency of the tire at the joints will be maintained and no vibrations will be produced during the rotation of the wheel by the meeting ends of the sections.

In order that each section may be properly held to the rim 1 a threaded lug or stem 5 is arranged within the rim adjacent one end of each section 2. This stem projects through the inner portion of the tire section and has a clamping plate 6 upon the end portion thereof and within the tire, there being another clamping plate 7 upon the stem and outside the tire and designed to be forced against the tire by means of a nut 8 or in any other suitable manner. It is of course to be understood that the plate 7 and nut 8 are disposed within a recess in the rim 1 as indicated at 9 so that there will be no danger of their injuring the tire.

Any suitable means such as a wing nut 10 may be arranged upon the exposed portion of the stem for the purpose of securing it and the tire to the rim. The other end portion of each tire section is held upon the rim by means of a combined lug and valve. This consists of a tubular valve casing 11 exteriorly screw threaded and having an angular flange 12 at that end thereof located within the tire, said flange bearing upon a washer 13 constituting a clamping ring. A nut 14 engages the casing 11 and is designed to clamp the tire against the washer 13, said nut being normally seated within a recess 15 within the rim 1. Another nut 16 engages the casing 11 and serves to retain it within the rim 1. Said casing 11 has a reduced neck 17 provided with a screw cap 18 and a suitable valve, not shown, is designed to be seated within the casing 11 in the ordinary manner, said valve constituting a check to prevent the escape of air from the inflated tire when the cap 18 is removed.

By fastening each tire section 2 to the rim by means of a lug and a valve such as herein described it will be obvious that said sections will be held firmly upon the rim and with their tongued ends lapping and forming a smooth continuous tread. Any desired number of these sections may be arranged upon a wheel and obviously should one of the sections become punctured and deflated the other sections will not be affected.

Although the invention is designed for use in connection with tires of the single tube type it is equally applicable to tires of the clencher type. This form of the device has been illustrated in Figs. 3 and 4 and consists of inner tube sections 19 each of which has its ends formed in the same manner as the sections 2 shown in Figs. 1 and 2 although it is to be understood that these inner sections are of finer and lighter material and are elastic so as to expand when inflated. Each section 19 has a valve tube 20 extending from the middle portion thereof and through the felly 21 of the wheel, said tube being similar to the ones ordinarily employed. A metal rim 21' is mounted on the felly and has inturned marginal flanges 22 designed to be engaged by the enlarged edge portions 23 of the outer tube 24 of the tire. This outer tube is also made up of sections preferably of the same length as the sections 19, the parts being preferably so proportioned that the tongues 19' of the sections 19 will project past the ends of the outer tube sections 24. The outer tube sections are preferably held in place by means of lugs consisting of threaded stems 25, each stem having a bowed or angular plate 26 attached to one end thereof and designed to press the enlarged edges 23 into engagement with the flanges 22 of the rim. A wing nut 27 or other suitable device is arranged on each stem for the purpose of tightening the plate 26 upon the outer tube. As shown particularly in Fig. 4 this plate is so shaped that when it is drawn toward the rim 21 it exerts a wedging action and forces the two enlarged portions 23 apart thus firmly locking them to the rim.

It will be seen that with both of the constructions herein described any one of the sections can be readily removed or replaced should injury occur to any one of them and the tire can still be used without injury to the wheel. This is especially true where more than four sections constitute each tire.

What is claimed is:

1. A pneumatic tire comprising separately removable inflatable sections, each section having a closed end, there being a recess within and an inflatable tongue upon each end of each section, the tongues of each section being disposed to be seated within the recesses of the adjoining sections and each constituting a portion of the tread of the tire.

2. In a pneumatic tire, a series of separately removable and separately inflatable sections, said sections having lapping inflatable tongues, all of the tongues constituting portions of the tread of the tire.

3. In a pneumatic tire, a series of separately removable and separately inflatable sections, said sections having lapping inflatable tongues at their ends and disposed side by side, there being recesses within the end portions of the sections for the reception of the tongues of the adjoining sections.

In testimony that I claim the foregoing as my own, I have hereto affixed my signature in the presence of two witnesses.

PAUL G. MUENCHINGER.

Witnesses:
WILLIAM WILLIAMS,
MARY J. RODERICK.